United States Patent

[11] 3,609,542

[72] Inventor Robert H. Burke
Penfield, N.Y.
[21] Appl. No. 821,279
[22] Filed May 2, 1969
[45] Patented Sept. 28, 1971
[73] Assignee Sybron Corporation
Rochester, N.Y.

[54] INSTRUMENTS HAVING INTEGRATING-TYPE CIRCUITS THEREIN
8 Claims, 1 Drawing Fig.

[52] U.S. Cl. .......... 324/111, 307/254, 320/1
[51] Int. Cl. .......... G01r 1/00, H03k 17/06
[50] Field of Search .......... 324/111; 328/151, 101; 307/254, 238; 235/183; 320/1

[56] References Cited

UNITED STATES PATENTS

| | | | |
|---|---|---|---|
| 2,835,868 | 5/1958 | Lindesmith | 324/111 |
| 3,406,337 | 10/1968 | Thornbert et al. | 324/111 |
| 3,061,682 | 10/1962 | Cirone | 307/254 X |
| 3,156,831 | 10/1964 | Baude | 307/254 |
| 3,419,784 | 12/1968 | Winn | 328/127 X |

*Primary Examiner*—Rudolph V. Rolinec
*Assistant Examiner*—Ernest F. Karlsen
*Attorneys*—Peter J. Young, Jr. and Joseph C. MacKenzie

ABSTRACT: Integrating type circuit having a two-transistor capacitor-discharging switch. In "off" condition, transistor leakage current is shunted away from the capacitor.

The transistors are connected together, emitter to collector, in series across the capacitor and by a resistance connected to said emitter and said collector, to a reference potential.

PATENTED SEP 28 1971 3,609,542
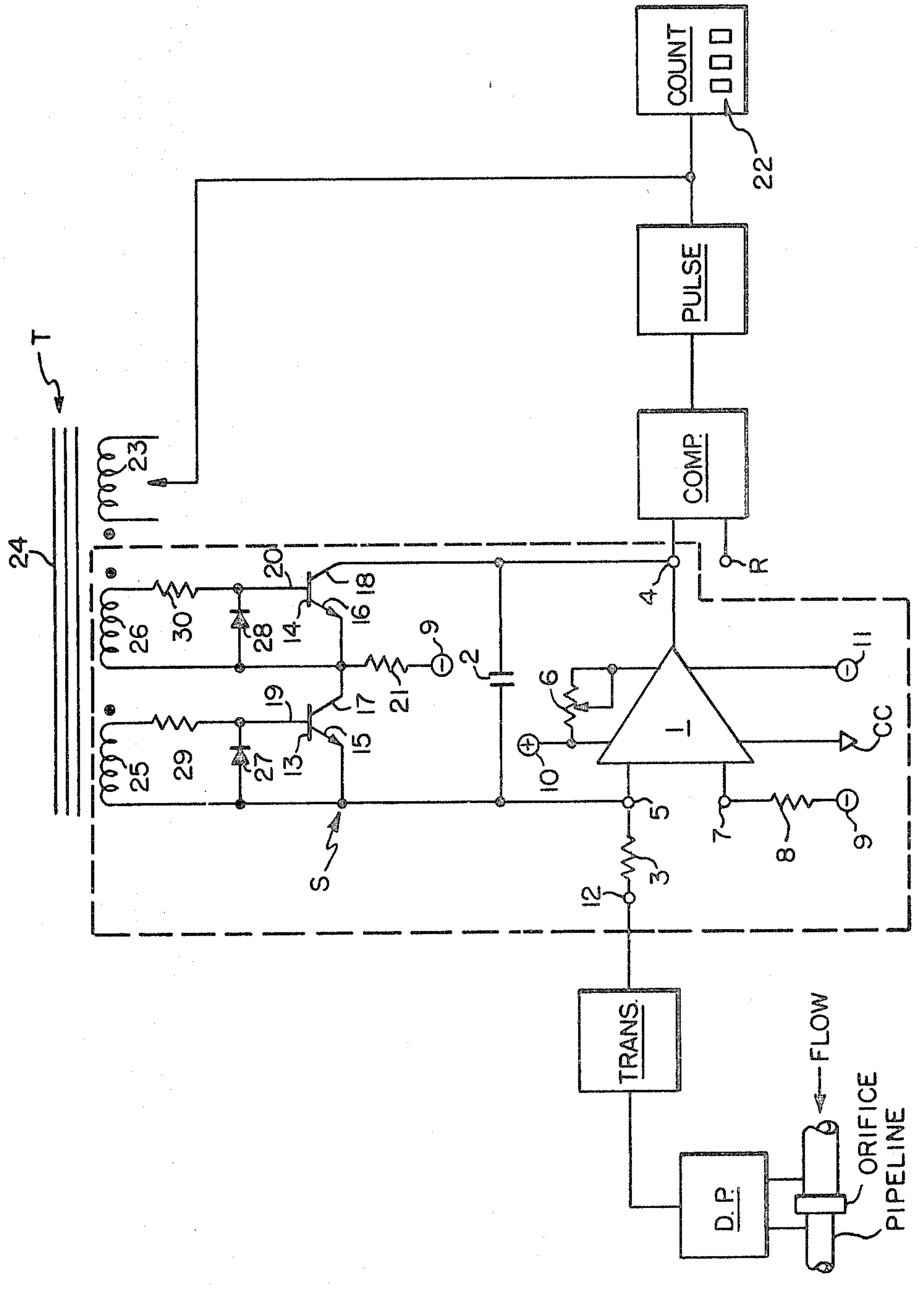
*INVENTOR*
ROBERT H. BURKE

INSTRUMENTS HAVING INTEGRATING-TYPE CIRCUITS THEREIN

This invention relates to instruments having integrating-type circuits therein. Instruments of this sort are useful in measurement and control, and include such diverse entities as ramp generators, flow integrators, and so on. In a typical integrating-type circuit, a voltage causes a capacitor to charge, and the capacitor is periodically discharged by shorting it out with switching means.

According to the present invention, the aforesaid switching means is provided in the novel form of a pair of transistors connected in series, emitter to collector, with the resulting interconnection being connected to the reference potential for the voltage which determines the charge on the capacitor. This circuit configuration substantially prevents transistor leakage current from affecting the charge on the capacitor. The drawing illustrates the invention in relation to a fluid flow integrating system.

In the FIGURE, an amplifier 1, feedback capacitor 2 and input resistor 3 provide the basic integrating action. Thus, one side of capacitor 2 is connected to amplifier output terminal 4, and its other side is connected to the feedback terminal 5 of the amplifier. Amplifier 1 preferably has a high DC open loop gain, for example, on the order of 30,000, and means for setting its offset voltage to zero, as by adjusting the variable resistor 6. An input terminal 7 of amplifier 1 is connected via a resistor 8 to a source of negative bias indicated by a terminal 9. Terminals 10 and 11, respectively, indicate connection to positive B-supply and negative B-supply, respectively. Circuit common for the input voltage at terminal 12, the B-supplies, and the output voltage at terminal 4, is indicated here by the inverted triangle CC.

As described thus far, the combination of amplifier 1, capacitor 2 and resistor 3 define a well-known integrating arrangement input to which is at terminal 12, a voltage of opposing sense appears at terminal 4, and is applied via capacitor 2 to feedback terminal 5. The high gain of amplifier 1 prevents the voltage at terminal 5 from departing from substantially circuit common potential. Over a period of time defined essentially by the values of capacitor 2 and 3, the voltage at terminal 4, at any instant, represents the time integral of the voltage applied to terminal 12.

In practical integrating-type circuits, the aforesaid period of time is actually defined by periodically discharging capacitor 2. Thus, if the voltage applied to terminal 12 is fixed in magnitude and sense, and the capacitor 2 is discharged at a fixed frequency, the voltage at terminal 4 has a saw-tooth form, so the circuit can be used as a so-called ramp generator.

If the voltage at terminal 12 varies, and its integral is desired, then the capacitor 2 is discharged each time the output voltage at terminal 4 attains a predetermined magnitude and, further, the discharges are counted.

Again, if the circuit is designed so that the rate of discharging capacitor is high with respect to fluctuation in the voltage at terminal 12, this rate is proportional to the magnitude of the voltage at terminal 12, so the circuit is also a voltage to frequency converter.

Efficacy of operation such as has been described, next supra, depends, among other things, on the means for discharging the capacitor. Thus, any single-throw, double-pole switch used for such service ought to be ideal, namely, have zero on-resistance and infinite off-resistance. This ideal, however, is not approximated both readily and economically, in electronic form. The basic object of this invention is to provide an integrating circuit having a transistor switch that does economically and readily closely approximate the ideal.

According to the present invention, a capacitor-discharging electronic switch S comprises transistors 13 and 14, having emitter electrodes 15 and 16, collector electrodes 17 and 18 and base electrodes 19 and 20, respectively. Transistor 13 has its collector electrode 17 connected to emitter electrode 16 of transistor 14, and these two electrodes are connected via a resistor 21 to the negative bias terminal 9. The emitter electrode 15 of transistor 13 is connected to terminal 5, and the collector electrode 18 of transistor 14 is connected to terminal 4.

It will be seen, therefore, that if both transistors are "on," capacitor 2 is shunted by the very low resistance of the transistors' emitter-collector paths in series. At this time, the transistors are, in essence, closed two-pole, single-throw switches in series, and the effect of resistor 21 can be ignored. (Switch S itself, of course, is also a kind of two-pole switch shunting capacitor 2.)

If both transistors are "off," however, their large, but not inappreciable leakage resistances are in series across the capacitor 2, and one of these resistances is shunted, in effect, by resistor 21. Due to the effect of negative feedback, this amounts connecting collector 17 and emitter 16 to terminal 7 of amplifier 1. As a result, switch leakage current, which is frequently a problem in transistor switching, is prevented from introducing error in the integrating action of the circuit, as will now be shown.

Consider the transistors in their "off" condition. At this time, the voltage drop across the switch (and across capacitor 2) will be the algebraic sum of the voltages at terminals 4 and 5. This voltage drop will attempt to cause flow of leakage current between terminals 4 and 5, via the transistors. However, by providing resistor 21 with a resistance value that is small compared to the off-resistance of either transistor, and by connecting transistor electrodes 16 and 17 to terminal 9 via resistor 21, the aforesaid voltage drop appears substantially entirely across the emitter-collector impedance of transistor 14. Thus, even if transistor 14 is leaky, the collector electrode 17 of transistor 13 is substantially at the voltage of terminal 9, to which terminal 7 of the amplifier 1 is connected. Since feedback via capacitor 2 maintains terminal 5 at substantially the same potential as terminal 9, there is essentially zero voltage between electrodes 15 and 17 of transistor 13, hence, no leakage current enters terminal 5.

Looking at it another way, resistor 21 is a sort of low resistance shunt to circuit common, around the high off-resistance of transistor 13, and through which most of the leakage current of transistor 14 flows. Transistor 13, in turn, can develop leakage current only in the measure of its emitter-collector voltage drop divided by its off-resistance.

In this way, transistor leakage current is prevented from introducing integration error. Thus, as is well known, the relation between the output voltage at terminal 4, and the input voltage at terminal 12, is supposed to be solely dependent (while the capacitor 2 is charging) on the capacitance of capacitor 2 and the resistance of resistor 3. While the open-circuit resistance of a moving-contact switch would normally be too high to have to be taken into account here, the off-resistance of transistors is not of the same order, and can frequently be low enough to affect the relation between output and input voltage. However, by dealing with the leakage current, as has been described, supra, the integrating action becomes substantially independent of transistor leakage resistance.

The drawing shows the invention in the form of a fluid-flow-integrating instrument. Thus, flow in a pipe is measured by sensing the differential pressure across an orifice 0 in said pipe by means of differential pressure instrument DP. Instrument DP applies the resultant signal to a transmission apparatus TRANS, which in turn produces an output voltage which is applied to terminal 12 to be integrated. Typically, the system is so designed that by the time the differential pressure signal gets to terminal 12 it is a DC voltage, frequently proportional to the square root of the differential, and often reflecting temperature, and other variables influencing the flow being measured.

In any event, the flow integration is in the end performed by counting the occurrences at terminal 4, of predetermined magnitude of output voltage on terminal 4. Thus, a comparator COMP compares this output voltage to a reference voltage at a terminal R. This reference voltage is set at the aforesaid predetermined magnitude, and when the output voltage at terminal 4 is equal to said magnitude, the comparator senses such equality and causes a pulse circuit PULSE to emit a switching pulse to a transformer T and to a pulse counter COUNT. The counter is essentially just a mechanical device having the usual number wheels 22 indicating the number of pulses applied to the counter since some original count, zero, say.

The switching pulse is applied to a winding 23 of transformer T and is coupled by a core 24 into the windings 25 and 26, winding polarities being indicated by the usual dots at the winding ends. Windings 25 and 26 are respectively coupled to the base and emitter electrodes of transistors 13 and 14, as shown. Likewise, diodes 27 and 28 are respectively coupled to the base and emitter electrodes of the two transistors, as shown and resistors 29 and 30 are in series with the corresponding base electrodes. This is a typical switching arrangement, and need not be described in any detail.

In operation, a positive DC voltage at terminal 12 affects the potential of terminal 5. Amplifier 1 amplifies the difference between this potential and that of terminal 9, producing an output voltage at terminal 4 and the right-hand side of capacitor. As there is no feedback via capacitor except when the voltage across the capacitor changes, the voltages at terminal 4 continuously changes and always in the same sense (unless the voltage at terminal 12 drops below the potential of terminal 9, which would not normally happen in flow integration applications).

Eventually, the voltage at terminal 4 reaches equality with the reference voltage at terminal R, and thereupon switch S, heretofore open, closes and discharges the capacitor 2. Switch S is closed only momentarily, so after capacitor 2 discharges, the latter immediately begins to charge up again. In the meantime, the device COUNT has registered on its indicator 22, 1 unit of flow, or whatever number of units of flow it takes to get capacitor 2 to charge from zero to the voltage at which it is discharged.

The voltage at terminal 12 could be normally more negative than terminal 9, in which case the sign of the reference voltage at terminal R would be reversed, and operation would be the same. Indeed, the voltage at terminal 12 could vary in both senses, giving the effect of mathematically integrating a function over a range including both positive and negative values of the function.

As remarked before, it may be desired to convert the differential pressure signal to a flow signal, at some point in the system, a matter of including a square-root conversion of the signal somewhere in the system. One convenient way of doing this is simply to duplicate the integrating circuit. Specifically, that which is outlined in dashed line in the FIGURE, would be inserted between the apparatus TRANS and terminal 12, or between the comparator and terminal 4 (the same transformer, with two additional windings for switching, would conveniently be used for switching both integrator circuits).

It will be noted also that a measurement of the frequency of the pulse output of the pulse circuit PULSE will give a measure of the magnitude of the differential pressure (or of its square root namely, the flow rate).

The foregoing description will suffice those skilled in the art to practice my invention. However, by way of example only the following are parts values and specifications of a typical actual example of the invention:

| | |
|---|---|
| Resistor 3 | 221Kohm |
| Resistor 6, variable | 0–50Kohm |
| Resistor 8 | 220Kohm |
| Resistor 21 | 78Kohm |
| Resistor 29, 30 | 330Kohm |

Resistor 21 was actually two resistors. In the square root version, each switch of the integrating circuit was connected to terminal 9 via a 22 K resistors.

Capacitor 2 was two 1-microfacad, 100 v., polycarbonate capacitors connectable singly, in series, or in parallel, to give ½-, 1- or 2-microfarads feedback capacitance, as desired.

Transistors 13 and 14 were 2N3569's, and diodes 27 and 28 were 1N914's. These are inexpensive NPN transistors, nonselected. While the transistor type is not critical, the best accuracy is obtained when the transistors are of the type where the on-resistance appears to begin at zero collector volts. PNP transistors could be used.

Field-effect transistors [both junction and MOS gate] could also be used. In this case, if on-resistance is high enough it may take the capacitor longer to discharge than is desirable, in which case resistor 3 could be increased and capacitor 2 could be decreased, thereby to maintain the integration time constant, while at the same time reducing the discharge time constant (the product of the capacitance of capacitor 6, and the resistance through which the capacitor discharges when switch S is on). Input bias current of the amplifier 1 would usually have to be reduced if resistor 3 is increased.

Diodes 27 and 28, and resistors 29 and 30 provided for absorbing the reverse voltage of the windings 25 and 26 following a switching pulse. Amplifier 1 was an Analog 105A operational amplifier, manufactured, by Analog Devices Inc., 221 5th St., Cambridge, Mass. The voltages at terminals 9, 10 and 11 were −0.250, +15and −15 volts, respectively, and resistor 6 was set to provide open loop gain of 30.000 or higher for 2.5 ma. output.

The apparatus TRANS produced an output voltage ranging from +0.250 to +1.250 volts DC across an output resistance of 62.5 ohms effectively between terminal 12 and circuit common. The negative voltage across resistor 8 reduces this range to 0 to 1.000, which is the only purpose of resistor 8.

Pulse source PULSE was operated by the comparator to produce an approximately 24-volt, 400-microsecond pulse when the comparator sensed equality of voltages at terminals R and 4 to about 2—8 millivolts.

My invention is capable of numerous uses and modifications in addition to what has been set forth hereinabove. As such uses and modifications will be evident to one skilled in the art, I regard them as falling within the scope of the claims appended hereto. Accordingly, having set forth my invention as required by the statutes,

I claim:

1. An integrating-type circuit comprising, in combination, an amplifier having a reference terminal, a feedback terminal, an output terminal, a capacitor interconnecting the latter two said terminals for maintaining feedback terminal voltage substantially fixed with respect to said reference terminal, impedance for connecting voltage to be integrated to said feedback terminal, and improved means shunting said capacitor for discharging same; said improved means comprising a first switch means having a first pole and a second pole, a second switch means having a third pole and a fourth pole, and resistance; said second and third poles being connected by said resistance to said reference terminal, said first pole being connected to one side of said capacitor, and said fourth pole being connected to the other side of said capacitor; said first switch means being operable from closed state to open state and vice versa; and said second switch means being operable from closed state to open state and vice versa, said closed state being one wherein there is short-circuit impedance between said first and second poles, and between said third and fourth poles; said open state being one wherein there is open-circuit impedance between said first and second poles, and between said third and fourth poles, and there being means for simultaneously operating both said switch means from closed state to open state, and vice versa, said resistance being small compared to said open-circuit impedance.

2. In an instrument including a circuit having an input terminal, a feedback terminal and an output terminal, and also including an input impedance and a feedback capacitor, said input impedance being connected between said input terminal and said feedback terminal, and said feedback capacitor having its one side connected to said output terminal, and its other side connected to said feedback terminal; said circuit also having a reference terminal, and being responsive to input voltage applied across said input terminal and said reference terminal such as to produce output voltage across said output terminal and said reference terminal and in predetermined relationship to said input voltage; said instrument further including a switch having a first pole and a second pole connected to said feedback terminal and to said output terminal respectively; said switch having an open state and a closed state, said open state being one wherein an open-circuit impedance exists between said poles, and said closed state being one wherein a short-circuit impedance exists between said poles, whereby if said switch is in said open state, the voltage across said capacitor is a function of the time integral of said input voltage, whereas if said switch is in said closed state, the voltage across said capacitor is substantially zero; the improvement wherein said switch includes a first transistor having a first air of electrodes, one an emitter and the other a collector, a second transistor having a second pair of electrodes, one an emitter and the other a collector, and resistance; one electrode of said first pair of electrodes being connected to an unlike electrode of said second pair, said one electrode and said unlike electrode each being connected by said resistance to said reference terminal, the remaining electrode of said first pair of electrodes being said first pole of said switch, and the remaining electrode of said second pair of transistors being said second pole of said switch; each said transistor having a base electrode, and each said base electrode being connected to switching means for applying the same switching signal to each said base simultaneously, and there being control means connected to said switching means for causing said switching signal to vary between two levels, at one of which each said transistor switches off, and at the other of which each said transistor switches on, said resistance being small compared to said open-circuit impedance.

3. An integrating-type circuit comprising, in combination, an amplifier having a reference terminal, an input terminal, an output terminal, a capacitor interconnecting the latter two said terminals, impedance for connecting voltage to be integrated to said input terminal, and improved means shunting said capacitor for discharging same; said improved means comprising a first transistor having a first base, a first collector and a first emitter, and a second transistor having a second base, a second collector and a second emitter, and resistance; said first emitter and said second collector being connected by said resistance to said reference terminal, said first collector being connected to one side of said capacitor, and said second emitter being connected to the other side of said capacitor, there being switching means for simultaneously applying a switching signal to said bases, and said resistance being small compared to the emitter-collector resistance of a said transistor in nonconducting state.

4. A flow integrating instrument, said instrument including the integrating-type circuit of claim 3, and further including transmission means and counting means, and wherein a. said transmission means is connected to said input terminal for applying thereto a DC voltage corresponding to the rate of flow of a fluid;
b. said counting means is connected to said switching means for counting each occurrence of said switching signal;
d. said switching means includes means responsive to voltage at said output terminal attaining a predetermined magnitude, for causing said switching signal to occur; the last said means being constructed and arranged such that said switching signal occurs only when the last said voltage has said predetermined magnitude, and exists for such time as is necessary for said improved means to substantially fully discharge said capacitor.

5. The integrating-type circuit of claim 3, wherein said switching means includes a comparator, a pulse circuit for producing said switching signal in the form of a pulse, and coupling means connecting said pulse circuit to the bases of said transistors for applying said pulse to said bases; said comparator being responsive to said voltage at said output terminal attaining said predetermined magnitude, such as to cause said pulse circuit to produce said pulse.

6. An integrating-type circuit including a capacitance, a resistance and a switch; said switch including a first transistor having first, second and third electrodes, said electrodes being respectively a base electrode, a collector electrode and an emitter electrode; said switch also including a second transistor having first, second and third electrodes, said electrodes being respectively a base electrode, an emitter electrode, and a collector electrode; said first electrodes being connected with switching circuitry for switching both said transistors at the same time; said second electrodes being connected together and to one end of said resistance, and the other end of said third electrodes for shunting the corresponding said transistor's emitter-collector impedance; said capacitance having its one side connected to said one of said third electrodes, and having its other side connected to the other of said third electrodes, said resistance being small compared to said emitter-collector impedance in nonconducting state.

7. The integrating-type circuit of claim 6, and including an amplifier having a first input terminal and a feedback terminal, and there being input resistance interconnecting same; said amplifier also having an output terminal, and said capacitance interconnecting said output terminal and said feedback terminal; said amplifier also having a second input terminal, and said other end of the first said resistance being connected to said second input terminal; said input resistance, said capacitance and said amplifier being chosen so as to define a conventional integrator wherein said capacitance charges to a voltage representing the time integral of voltage across said input terminal, and said feedback terminal is normally maintained at a voltage immaterially different from the voltage of said second input terminal.

8. The integrating-type circuit of claim 6, wherein said switching circuitry includes means for producing a switching pulse in response to a predetermined voltage across said capacitance, and for applying said pulse to said transistors to switch same on simultaneously.